United States Patent [19]

Glennon

[11] Patent Number: 5,157,594
[45] Date of Patent: Oct. 20, 1992

[54] TEMPERATURE-BASED INVERTER CONTROL SYSTEM

[75] Inventor: Timothy F. Glennon, Rockford, Ill.

[73] Assignee: Sundstrand Corporation, Rockford, Ill.

[21] Appl. No.: 760,350

[22] Filed: Sep. 16, 1991

[51] Int. Cl.$^5$ .................. H02M 1/12; H02M 7/48
[52] U.S. Cl. ..................... 363/41; 363/79; 363/95
[58] Field of Search ............ 363/41, 79, 95, 56, 363/58

[56] References Cited

U.S. PATENT DOCUMENTS

| | | | |
|---|---|---|---|
| 3,473,039 | 10/1969 | Fegley | 307/11 |
| 3,876,924 | 4/1975 | Peters, Jr. | |
| 3,883,792 | 5/1975 | Ellert | |
| 4,251,735 | 2/1981 | Coleman | 307/46 |
| 4,320,273 | 3/1982 | Kiuchi | 219/10.49 R |
| 4,464,606 | 8/1984 | Kane | 315/158 |
| 4,527,226 | 7/1985 | Glennon | 363/41 |
| 4,600,823 | 7/1986 | Hiejima | 219/10.77 |
| 5,006,973 | 4/1991 | Turner | 363/34 |
| 5,068,777 | 11/1991 | Ito | 363/41 |

FOREIGN PATENT DOCUMENTS

| | | |
|---|---|---|
| 65672 | 3/1990 | Japan . |
| 56074 | 3/1991 | Japan . |
| 178565 | 8/1991 | Japan . |

*Primary Examiner*—William H. Beha, Jr.
*Attorney, Agent, or Firm*—Marshall, O'Toole, Gerstein, Murray & Bicknell

[57] ABSTRACT

A control system for controlling an inverter having a connector for connecting the output of the inverter to a load wherein a temperature sensing arrangement senses the temperature of the connector and a controller responds to the temperature of the connector for controlling the inverter in order to control the inverter output.

23 Claims, 4 Drawing Sheets

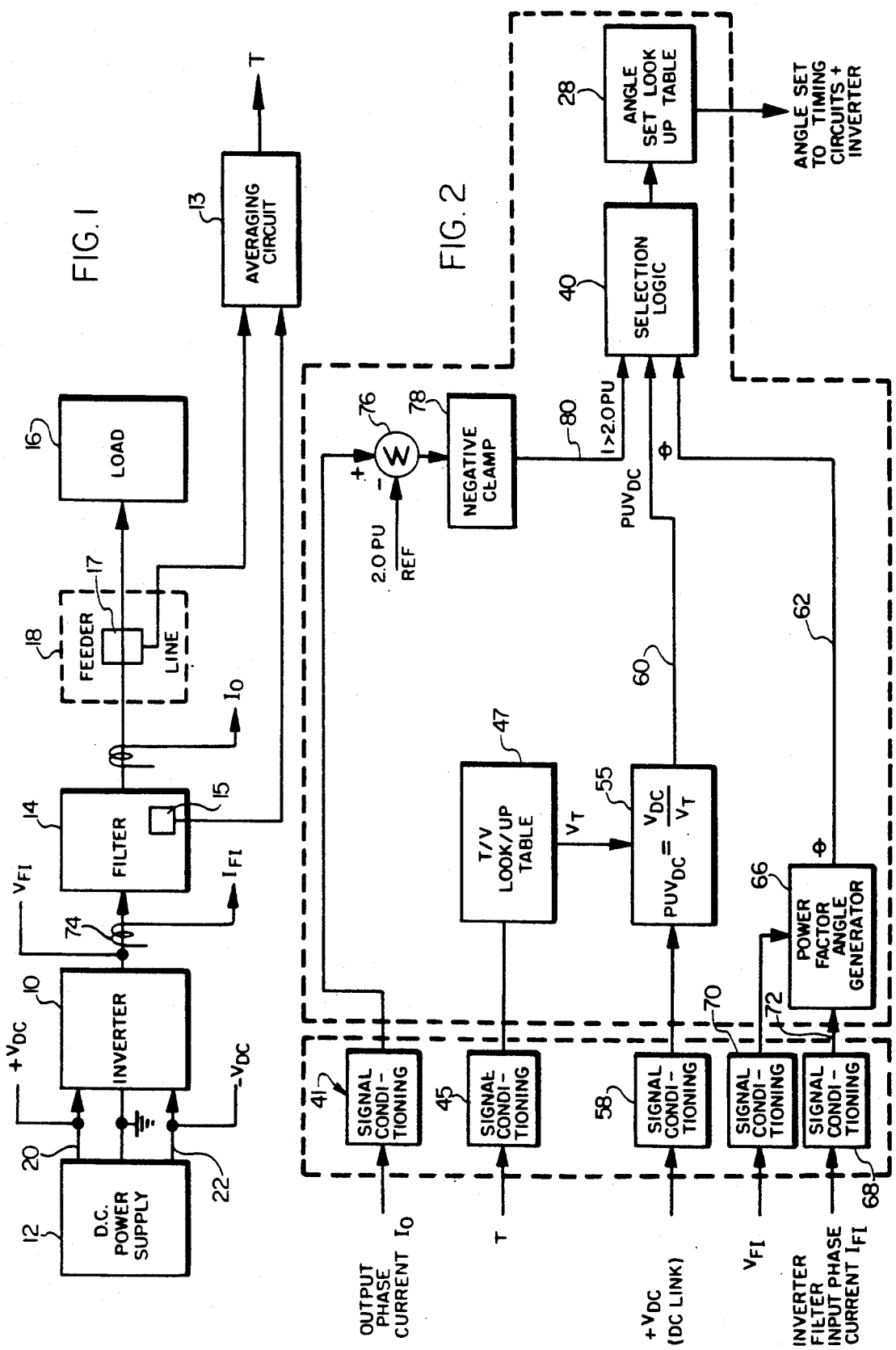

TEMPERATURE-BASED INVERTER CONTROL SYSTEM

BACKGROUND OF THE INVENTION

The present invention relates to a control system for controlling an inverter for providing AC output from DC input and, more particularly, to such a control system which is responsive to the temperature of the system sensed between the output of the inverter and the load rather than to a feedback voltage.

My prior U.S. Pat. No. 4,527,226 discloses a pulse width modulated (PWM) inverter, having a DC input, which may be employed, for example, on aircraft and the like to provide a waveform to a filter having an AC output which supplies power to loads. Load inverters typically include a pair of switches connected between the positive and negative terminals of the DC power supply and the AC load. The inverter switches, which may be transistors or the like, are controlled to provide a pulse width modulated waveform to the filter which, in response to this waveform, provides an AC output for supply to the load.

Known PWM inverters typically include a control system which operates the inverter switches to provide a single pattern pulse width modulated waveform to the filter. However, with any single pattern of pulse width modulated waveforms, distortion associated with power factor loads, i.e., reactive loads, may be produced in the output. Inverters employing known control systems to provide a single pattern pulse width modulated waveform typically do not take into account power factor loads which may introduce undesirable harmonics which are not easily filtered in the output of the inverter. In order to eliminate these harmonics from the inverter output waveform, the attenuation requirement of the output filter must typically be very large resulting in a heavy filter which is undesirable for many applications. Further, inverters employing such control systems typically do not compensate for voltage drops occurring between the DC power supply of the inverter and the point of regulation at which the AC output is applied to the load so that the peak amplitude of the AC output is not constant.

My prior U.S. Pat. No. 4,527,226 discloses an inverter control system which provides selection of an angle set defining an inverter output waveform in response to the power factor of the load and the normalized DC bus voltage so as to minimize the harmonic content of the inverter output waveform and to compensate for voltage drops occurring between the DC power supply and the load.

The inverter control system disclosed there includes an angle set look-up table for storing a number of angle sets, a plurality of which define pulse width modulated waveforms and at least one of which defines a quasi-square wave. The control system selects an angle set defining a pulse width modulated waveform in response to the power factor angle and a normalized DC bus voltage having a value which is greater than or equal to one. The angle set defining the quasi-square wave is selected by the control system in response to the normalized DC bus voltage having a value which is less than one indicating transient conditions.

The control system is also responsive to filter output current to detect fault conditions. In response to a detected fault condition, the control system selects at least one angle set defining a waveform to reduce the voltage at the load to zero while allowing the filter output current to increase to a given percentage of the rated current so as to enable actuation of circuit breakers such as those on aircraft.

These prior inverter control systems use the voltage supplied to the load as a feedback. The system compares the feedback voltage to a reference voltage and will control the inverter accordingly. The range of control for the voltage being supplied to the load will depend upon the gain of the inverter control system. This gain has a limiting effect on the ability of the control loop to provide control for a wide range of voltage fluctuations in the voltage being supplied to the load. For example, if the error between the feedback voltage and the reference voltage becomes too large, the gain required to bring the system back to reference may cause the control loop to go unstable. On the other hand, if the system can avoid using feedback voltage, the stability problems occasioned by the gain of the control loop can be minimized or avoided.

SUMMARY OF THE INVENTION

The system according to the present invention does not rely upon feedback voltage in order to control the inverter but instead includes an inverter for receiving DC input and for providing an inverter output, a connection system having an input connected to the inverter for receiving the inverter output and having an output for providing AC power, a temperature sensing arrangement for sensing the temperature of the connection system, and an inverter controller connected to the temperature sensing arrangement and to the inverter, the inverter controller being responsive to the temperature of the connection system for controlling the inverter in order to control the inverter output.

In other arrangements of the invention, the temperature sensing arrangement can utilize a plurality of temperature sensors for sensing the temperatures at different locations in the connection system and may include an averaging circuit for deriving an average temperature of the plurality of locations. The control system will then respond to the average temperature for controlling the inverter output. This average temperature can be a weighted average temperature if desired.

BRIEF DESCRIPTION OF THE DRAWINGS

These and other features and advantages of the invention will become more apparent from the detailed consideration of the invention when taken in conjunction with the drawings in which:

FIG. 1 is a block diagram of the inverter system for providing an AC output to a load;

FIG. 2 is a block diagram of the inverter control system of the present invention;

DETAILED DESCRIPTION OF THE ILLUSTRATED EMBODIMENT

Figure 4:
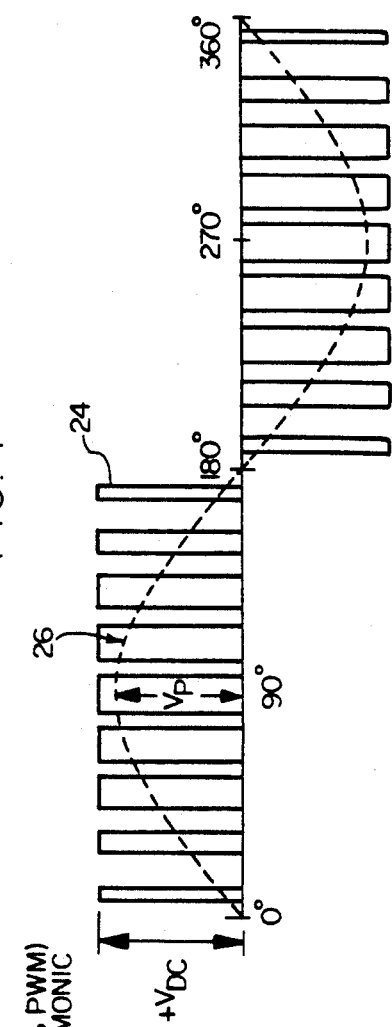
FIG. 4 is a graph illustrating a pulse width modulated waveform.

Inverter 10 having DC power supply 12 as shown in FIG. 1 is controlled by the system shown in FIG. 2 to provide a waveform to filter 14 which, in response thereto, provides an AC output which is coupled to load 16 by feeder line 18. Inverter 10 is preferably a neutrally clamped pulse width modulated inverter which may be controlled to provide both pulse width modulated waveforms and quasi-square waves such as shown in the copending application Ser. No. 531,037 assigned to the assignee of the present invention. The neutrally clamped inverter includes a pair of inverter switches, such as transistors, which respectively connect the positive terminal 20 and the negative terminal 22 of the DC power supply 12 to the filter 14. The inverter also includes a bidirectional switch which connects the input of the filter 14 to ground. The switches are turned on and off at selected angles so as to provide a pulse width modulated waveform 24, such as that shown in FIG. 4 to the filter 14 which, in response thereto, provides a sine wave output 26. The angles at which the inverter switches are turned on and off, ignoring a slight delay in the output, correspond respectively to the leading and trailing edges of the pulses forming the inverter output waveform and thus define the waveform to be provided by the inverter.

The inverter control system as shown in FIG. 2 includes an angle set look-up table 28 which stores a number of angle sets. The angle sets define the angles at which the inverter switches are to be turned on and off to control the inverter under various operating conditions to provide a waveform which has easily filtered harmonics and voltage regulation to compensate for voltage fluctuations occurring between the DC power supply and the load. Angle sets defining pulse width modulated waveforms having easily filtered harmonics are those wherein the harmonics of the waveform up to 2N, where N is the number of pulses per half-cycle, are rendered nearly zero or minimized so that the first harmonic to be filtered is the 2N+1 harmonic. Because the first harmonic which must be filtered is the 2N+1 harmonic, the attenuation requirement of the filter 14 and the weight thereof may be reduced. It has been found that angle sets defining a waveform as shown in FIG. 4 having nine pulses per half-cycle so that N=9, provide an easily filtered waveform.

Figure 3:
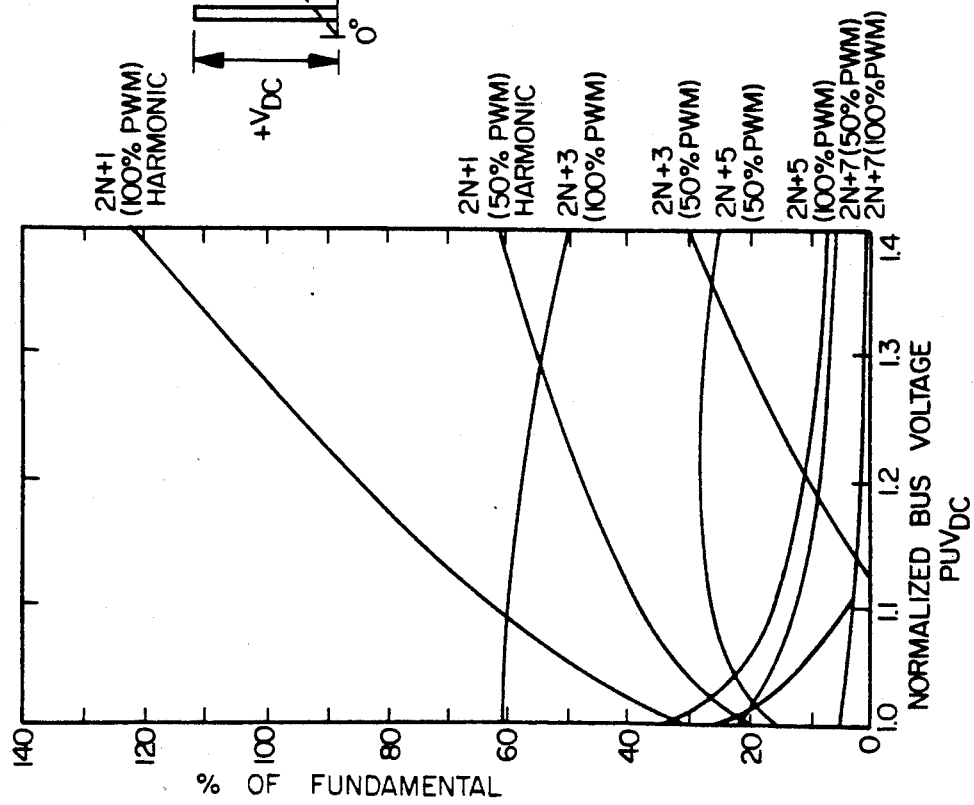
FIG. 3 is a graph illustrating the harmonic content change of two PWM inverter outputs as a function of the normalized DC bus voltage.

The various operating conditions for which angle sets are stored in the angle set look-up table 28 take into account power factor loads and voltage fluctuations occurring between the DC power supply and the load. Power factor loads may introduce undesirable low order harmonics into the output waveform if not taken into account in the selection of an angle set to control the inverter switches. Further, the harmonic content of a pulse width modulated waveform is also affected by variations in the normalized DC bus voltage as illustrated in FIG. 3. FIG. 3 shows the changes in harmonic content of a 100% PWM inverter output waveform, having a voltage swing of the rail-to-rail voltage, $+V_{DC}$ to $-V_{DC}$, and of a 50% PWM inverter output waveform, having a voltage swing of one-half the rail-to-rail bus voltage, as a function of the normalized DC bus voltage $PUV_{DC}$. By taking into account the normalized DC bus voltage and the power factor of the load in selecting the angle set for controlling the inverter, the harmonic content of the inverter output waveform may be minimized so that the first harmonic to be filtered is the 2N+1 harmonic.

Figure 6:
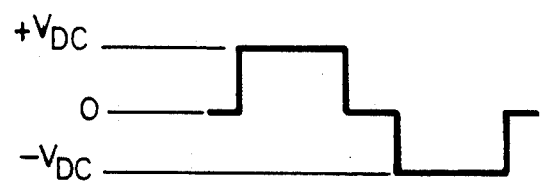
FIG. 6 is a graph illustrating a quasisquare wave.
Figure 7:
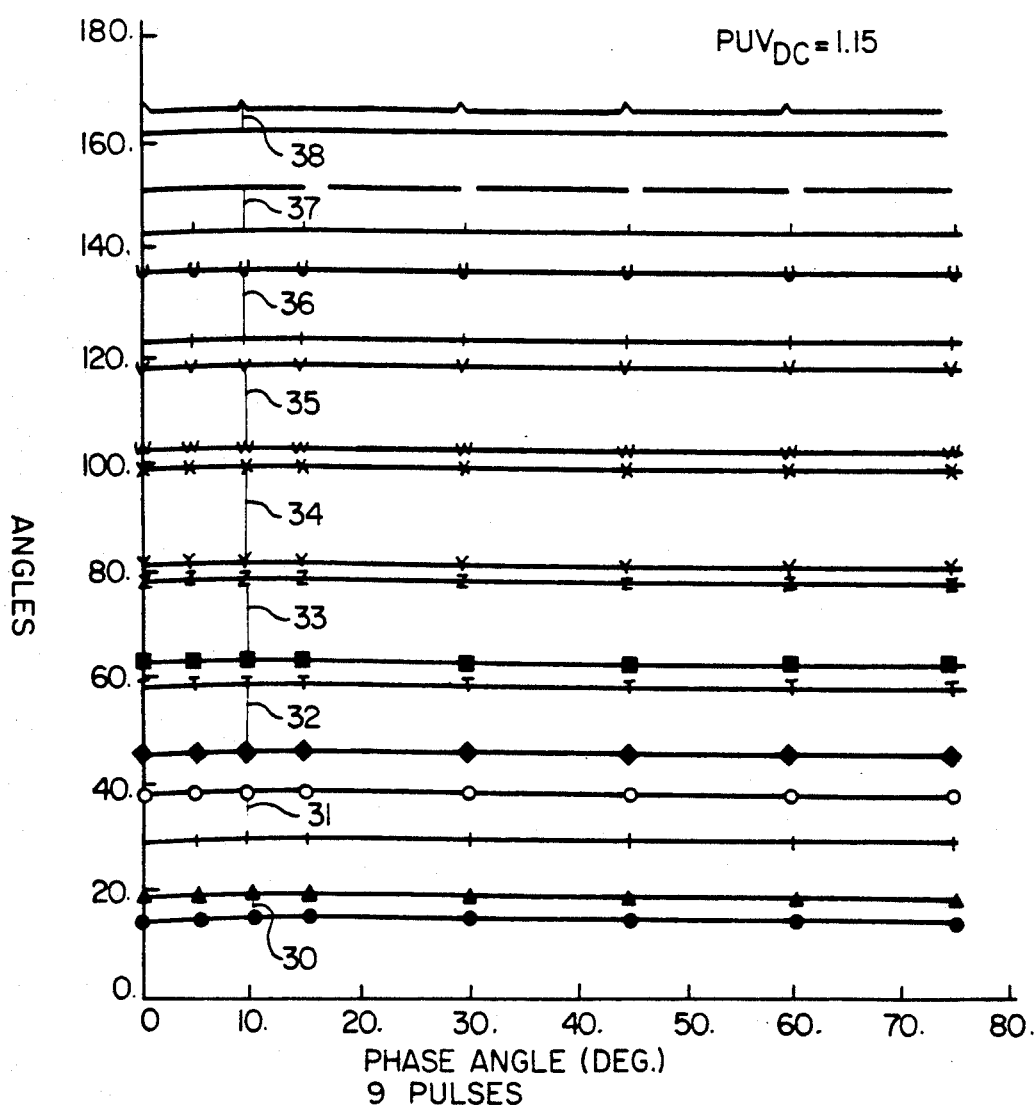
FIG. 7 is a graph illustrating various angle sets for a fixed normalized DC bus voltage and a variable power factor angle.
Figure 8:
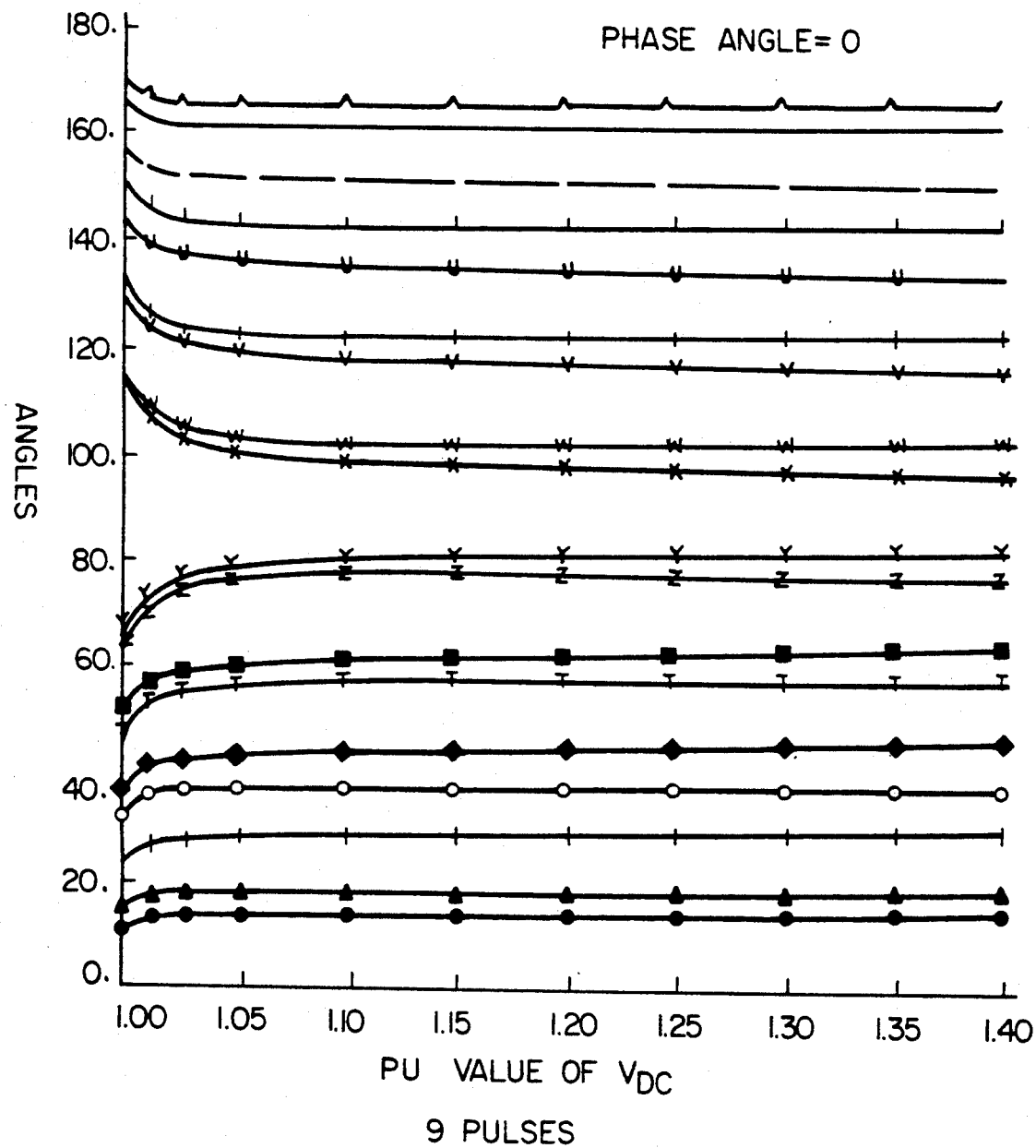
FIG. 8 is a graph illustrating various angle sets for a fixed power factor angle and variable normalized DC bus voltage.

The angle set look-up table 28 may be configured to store a number of subtables, each of which corresponds to a different fixed normalized DC bus voltage, $PUV_{DC}$, such as shown in FIG. 7 for $PUV_{DC}=1.15$. For this configuration, each subtable stores a number of angle sets, each corresponding to a different power factor angle ranging from 0° to 75° and each defining a pulse width modulated waveform comprised, for example, of nine pulses 30-38 such as shown for a power factor angle of 10°. Alternatively, the angle set look-up table 28 may be configured to store subtables corresponding to different fixed power factor angles, such as shown in FIG. 8 for a power factor angle of 0°. Each subtable for this configuration stores a number of angle sets, each corresponding to a different normalized DC bus voltage $PUV_{DC}$ ranging from 1.00 to 1.40. The subtables and angle sets, whether configured as shown in FIGS. 7 or 8, are addressed by selection logic circuit 40 according to the normalized DC bus voltage and power factor angle. The angle set look-up table 28 also stores at least one angle set defining a quasi-square wave such as shown in FIG. 6., the quasi-square wave angle set being addressed by selection logic circuit 40 under certain operating conditions as discussed below.

As shown in FIGS. 1 and 2, the normalized DC bus voltage $PUV_{DC}$ is derived from the positive DC bus voltage, $+V_{DC}$, and either the temperature of the filter 14 or the temperature of the feeder line 18 or a combination of both. If the temperature of filter 14 and the temperature of feeder line 18 are used, then it may be useful to use an averaging circuit 13 for providing a signal which is the weighted average of these temperatures. It may also be useful to sense the temperature at a plurality of points along feeder line 18 since the feeder line can be quite long, on the order of 200 feet or more. Thus, an averaging circuit can take the average of these temperatures and provide an appropriate signal as shown in FIG. 1. If the temperature of the filter is used, the temperature sensor can be mounted to the inductor which forms part of the LC filter. It is preferable that the sensor be a linear temperature sensor, such as a platinum bulb temperature sensor, but nonlinear temperature sensors, such as a thermocouple, can be used as well.

Since there is a direct correlation between the output voltage of filter 14 and the temperature on the feeder line and/or in the filter, the temperature of the feeder line and/or filter can easily replace the point of reference (POR) phase voltage, shown in U.S. Pat. No. 4,527,226 in generating the normalized DC input. To this end, temperature sensors can be mounted in temperature sensing relationship to feeder line 18 at one or more locations therealong. One or more sensors will provide an output voltage which is linearly related to temperature.

The phase current $I_o$ is sensed at the output of the filter 14 by a current transformer or the like. The phase current $I_o$ is applied to signal conditioning circuit 41 which rectifies and filters the sensed phase current so as to provide a DC level output on line 42 which is proportional to the current $I_o$.

The temperature signal, or the average temperature signal, is supplied through signal conditioning circuit 45 to temperature-to-voltage look-up table storage means 47. The look-up table stored in storage means 47 contains a plurality of voltages, each relating to a specific temperature. For example, since the voltage on feeder line 18 bears a known relationship to the temperature of the feeder line, the voltage on the feeder line can be determined if its temperature is known. Thus, the temperature of the feeder line is supplied to look-up table storage means 47 as an address to a storage location in the storage means. This address location contains the voltage which will be on the feeder line at that particular temperature. The relationship between the temperature sensed by a linear temperature sensor and the voltage it produces is linear so that the table stored in storage means 47 is a linear relationship between sensed temperature and the voltage supplied by storage means 47. If this relationship is nonlinear because of the use of a nonlinear sensor, then the table must be arranged to store voltage values which bear a nonlinear relationship to temperature. In either event, these voltage values can be determined empirically. This voltage from storage means 47 is supplied as an input to normalizing DC input circuit 55.

The positive DC bus voltage $+V_{DC}$, is sensed at the terminal 20 and applied to circuit 55 through signal conditioning circuit 58. Circuit 55 determines the normalized DC bus voltage, $PUV_{DC}$, by dividing the positive DC bus voltage by the voltage supplied by the temperature-to-voltage look-up table storage means 47. The normalized DC bus voltage output from circuit 55 on line 60 is applied to selection logic circuit 40 which, in response to the normalized DC bus voltage and the signal applied on line 62 representing the power factor angle, selects an angle set from the angle set look-up table 28 to control the inverter to provide an easily filtered waveform with voltage regulation for the conditions under which the inverter is operating.

The power factor angle represents the phase difference between the voltage $V_{FI}$ and current $I_{FI}$ at the input of filter 14. The inverter filter input phase current $I_{FI}$ and phase voltage $V_{FI}$ are applied to a power factor angle generator 66 through respective signal conditioning circuits 68 and 70. The signal conditioning circuit 68 includes a filter to provide a smooth sine wave output on line 72 in response to the phase current sensed by current transformer 74 at the input to the filter 14. Signal conditioning circuit 70 is responsive to the pulse width modulated waveform, $V_{FI}$, applied to the input of the filter to provide a sine wave output in phase therewith. The power factor angle generator 66 may include two zero crossover detectors which are respectively responsive to the phase current $I_{FI}$ and phase voltage $V_{FI}$ to determine the point at which each of the signals crosses zero. The power factor angle generator 66 also includes a phase detector which is responsive to the outputs of the zero crossover detectors to determine the phase difference between the voltage and current waveforms at the input to the filter 14. The phase difference representing the power factor angle is supplied on line 62 to selection logic circuit 40. It is noted that signal conditioning circuit 70 and the zero crossover detector associated with the phase voltage $V_{FI}$ may be eliminated since the zero crossover point of the voltage waveform output from the inverter 10 is known from the angle set applied to the timing circuits which control the inverter switches.

Selection logic circuit 40, in selecting an angle set from look-up table 28 to control the inverter under the operating conditions indicated by the normalized DC bus voltage on line 60 and the power factor angle on line 62, first determines whether the normalized DC bus voltage $PUV_{DC}$ is greater than or equal to one, a normalized DC bus voltage having a value less than one indicating transient conditions. If the normalized DC bus voltage $PUV_{DC}$ is greater than or equal to one, the selection logic 40 addresses the angle set look-up table 28 to select an angle set defining nine pulses per half-cycle of a pulse width modulated waveform, the angle set corresponding to the normalized DC bus voltage on line 60 and the power factor angle on line 62.

If there is a sharp increase in load 16, transients can develop causing a significant drop in the voltage, and therefore an increase in temperature, on the feeder line. A significant increase in temperature will cause the required voltage $V_T$ to increase to a value which is greater than the positive DC bus voltage so that the normalized DC bus voltage $PUV_{DC}$ is less than one. In response to a normalized DC bus voltage which is less than one, the selection logic circuit addresses the look-up table 28 to select an angle set defining a quasi-square wave to provide voltage regulation while operating under transient conditions. Alternatively, the selection logic circuit may address the look-up table 28 to select successive angle sets defining waveforms having seven pulses, five pulses and three pulses, after which an angle set is selected defining a quasi-square wave to provide the aforementioned voltage regulation while operating under transient conditions.

The inverter control system of FIG. 2 is also responsive to the filter output phase current $I_O$, to determine whether fault conditions exist. If fault conditions are detected, the selection logic circuit 40 overrides the selection of an angle set in response to the normalized DC bus voltage and selects at least one angle set defining an inverter output waveform to reduce the voltage to the load to zero while allowing the filter output phase current $I_o$ to increase to a given percentage of the rated current required to actuate circuit breakers.

Figure 5:
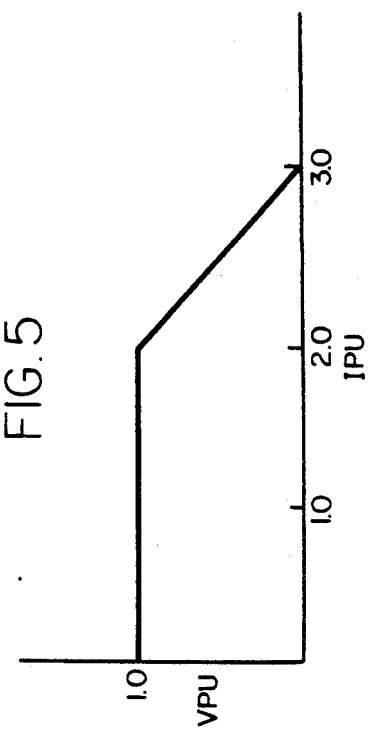
FIG. 5 is a graph illustrating the filter output voltage as a function of the filter output current.

In order to determine whether fault conditions exist, the signal output on line 42 which is proportional to the phase current $I_o$ is applied to the positive input terminal of summing junction 76, to the negative input terminal of which is applied a reference signal of 2.0 per unit, i.e., 200% of the rated current. If the phase current is greater than 200% of the rated current, the output of the summing junction is positive indicating fault conditions. The output of summing junction 76 is applied to negative clamp 78 which, in response to a positive input signal, provides a signal output on line 80 which is proportional to the phase current greater than 200%. Selection logic circuit 40 responds to an output on line 80 indicating that the phase current is greater than 200% of the rated current by selecting successive angle sets defining pulse width modulated waveforms having a decreasing number of pulses. For example, the selection logic circuit 40 may select successive angle sets defining waveforms having seven pulses, five pulses and three pulses, after which an angle set is selected defining a quasi-square wave to enable the voltage to the load to be decreased to zero while allowing the current to increase, as shown in FIG. 5, to a level such as 300% of the rated current which level is required to actuate circuit breakers.

The inverter control system as shown in FIG. 2 provides selection of an angle set defining a pulse width modulated waveform in response to the power factor angle and the normalized DC bus voltage so as to minimize the harmonic content of the waveform and provide voltage regulation. The control system also provides for selection of an angle set defining a quasi-square wave to regulate the inverter output under transient and fault conditions.

What is claimed is:

1. In a control system for an inverter, the inverter receiving DC input and being controlled in accordance with an angle set to provide an inverter output waveform which is coupled to the input of a filter, said filter providing AC output for supply along a feeder line to a load, the angle set defining a waveform to be provided by the inverter, the control system including storage means for storing a plurality of angle sets defining pulse width modulated waveforms to be provided by the inverter, power factor angle determining means for determining the power factor angle of the input to the filter, and selecting means for selecting an angle set from said storage means in response to a normalized DC input and the power factor angle, said angle set being supplied to the inverter for controlling the inverter to minimize the harmonics of the inverter output waveform, an improved normalizing means for supplying said normalized DC input comprising:

temperature sensing means for sensing the temperature of the control system between the inverter and the load;

signal supply means connected to said temperature sensing means for supplying, in response to said temperature, a signal representing said AC output; and normalized DC input means responsive to said signal and to said DC input for providing said normalized DC input.

2. The improved normalizing means of claim 1 wherein said signal is a voltage signal and said signal supply means comprises look up table storage means for storing a temperature to voltage look up table wherein said look up table storage means supplies to said normalized DC input means said voltage signal based upon said temperature.

3. The improved normalizing means of claim 2 wherein said temperature sensing means comprises a temperature sensor for sensing the temperature of said feeder line.

4. The improved normalizing means of claim 2 wherein said temperature sensing means comprises a temperature sensor for sensing the temperature of said filter.

5. The improved normalizing means of claim 4 wherein said temperature sensing means comprises a temperature sensor for sensing the temperature of said feeder line.

6. The improved normalizing means of claim 5 wherein said temperature sensing means comprises an averaging circuit responsive to both said temperature sensors for providing a temperature signal which is the average of the temperatures sensed thereby.

7. The improved normalizing means of claim 2 wherein said temperature sensing means comprises a plurality of temperature sensors, each temperature sensor sensing the temperature of said feeder line at a different location, and a temperature averaging means for providing a temperature signal which is the average of the temperatures sensed by said plurality of temperature sensors.

8. In a control system for an inverter, the inverter receiving DC input and having an output for supplying an AC output to feeder line means, said inverter being controlled in accordance with an angle set defining a waveform to be provided by the inverter, the control system including storage means for storing a plurality of angle sets defining pulse width modulated waveforms to be provided by the inverter, power factor angle determining means for determining the power factor angle of the AC output, and selecting means for selecting an angle set from said storage means in response to a normalized DC input and the power factor angle, said angle set being supplied to the inverter for controlling the inverter AC output waveform, an improved normalizing means for supplying said normalized DC input comprising:

temperature sensing means for sensing the temperature of said feeder line means;

signal supply means connected to said temperature sensing means for supplying a signal based upon said temperature; and normalized DC input means responsive to said signal and to said DC input for providing said normalized DC input.

9. The improved normalizing means of claim 8 wherein said signal is a voltage signal and said signal supply means comprises look up table storage means for storing a temperature to voltage look up table wherein said look up table storage means supplies to said normalized DC input means said voltage signal based upon said temperature.

10. The improved normalizing means of claim 9 wherein said temperature sensing means comprises a plurality of temperature sensors and a temperature averaging means for providing a temperature signal which is the average of the temperatures sensed by said plurality of temperature sensors.

11. The improved normalizing means of claim 8 wherein said temperature sensing means comprises a plurality of temperature sensors and a temperature averaging means for providing a temperature signal which is the average of the temperatures sensed by said plurality of temperature sensors.

12. A system for receiving DC input and for providing AC output comprising:

inverter means for receiving DC input and for providing an inverter output;

connecting means having an input connected to said inverter means for receiving said inverter output and an output for providing AC power;

temperature sensing means for sensing the temperature of said connecting means; and control means connected to said temperature sensing means and to said inverter means, said control means being responsive to said temperature for controlling said inverter means in order to provide said inverter output.

13. The control system of claim 12 wherein said temperature sensing means comprises a temperature sensor and a look up table storage means for storing a temperature to voltage look up table wherein said look up table storage means supplies a voltage signal based upon said temperature.

14. The control system of claim 13 wherein said control means comprises normalizing means responsive to said DC input and to said voltage signal for providing a normalized DC input.

15. The control system of claim 14 wherein said control means comprises power factor angle determining means for determining the power factor angle of said inverter output.

16. The control system of claim 15 wherein said control means comprises a look up table storage means responsive to said power factor angle and to said normalized DC input for supplying to said inverter means an angle set for controlling said inverter means in a way to minimize harmonic content in said AC output.

17. The control system of claim 12 wherein said connecting comprises a filter and a feeder line, said filter being connected to the output of said inverter means and said feeder being connected to said filter for supplying said AC power to a load.

18. The control system of claim 17 wherein said temperature sensing means comprises a temperature sensor for sensing the temperature of said feeder line.

19. The control system of claim 17 wherein said temperature sensing means comprises a temperature sensor for sensing the temperature of said filter.

20. The control system of claim 19 wherein said temperature sensing means comprises a temperature sensor for sensing the temperature of said feeder line.

21. The control system of claim 20 wherein said temperature sensing means comprises an averaging circuit responsive to both said temperature sensors for providing a temperature signal which is the average of the temperatures sensed thereby.

22. The control system of claim 17 wherein said temperature sensing means comprises a plurality of temperature sensors, each temperature sensor sensing the temperature of said feeder line at a different location, and a temperature averaging means for providing a temperature signal which is the average of the temperatures sensed by said plurality of temperature sensors.

23. The control system of claim 12 wherein said temperature sensing means comprises a plurality of temperature sensors, each temperature sensor sensing the temperature of said connecting means at a different location, and a temperature averaging means for providing a temperature signal which is the average of the temperatures sensed by said plurality of temperature sensors.

* * * * *